Oct. 25, 1938.  B. W. JONES  2,134,517

ELECTRICAL CONTROL OR REGULATING SYSTEM

Filed May 22, 1935

Inventor:
Benjamin W. Jones,
by Harry E. Dunham
His Attorney

Patented Oct. 25, 1938

2,134,517

UNITED STATES PATENT OFFICE 2,134,517

ELECTRICAL CONTROL OR REGULATING SYSTEM

Benjamin W. Jones, Schenectady, N. Y., assignor to General Electric Company, a corporation of New York Application May 22, 1935, Serial No. 22,758

13 Claims. (Cl. 171—119)

My invention relates to electrical control or regulating systems and more particularly to systems of this type which do not employ electrical contacts.

As is well known, electrical contacts are subject to oxidation, pitting, burning, sticking, electrodeposition of metal from one contact to the other, and other objectionable phenomena all of which in time impair and shorten the useful life of such systems or else require periodic inspection and servicing.

In accordance with my invention I provide a rugged, simple and inexpensive control or regulating system which is sensitive in operation. This system makes use of a main controlled device, such as a booster transformer, whose operation is controlled by a non-linear volt-ampere characteristic element, such as a non-linear series resonant circuit. In a voltage regulating system the resonant circuit may be made responsive to the voltage of the circuit so as to be very critical to changes in the value thereof and this sensitive and critical response of the non-linear circuit may be made to control the heating effect of an electrical heater for a thermally responsive actuating means such as a bimetallic strip or gas filled bellows, which then may be made to control the voltage of the booster transformer, either directly or indirectly by a variable resistor, in the proper manner to regulate the voltage of the circuit.

It should be understood, however, that although the above system represents a combination of elements making up a particular detailed form of my invention, nevertheless this combination contains numerous novel and useful subcombinations in which all of the elements are not used but which sub-combinations are capable of various useful general applications.

An object of my invention is to provide a novel, simple and rugged electrical control or regulating system.

A further object of my invention is to provide a control or regulating system which is sensitive in operation and which does not employ electrical contacts.

My invention will be better understood from the following description taken in connection with the accompanying drawing and its scope will be pointed out in the appended claims.

Figure 1:
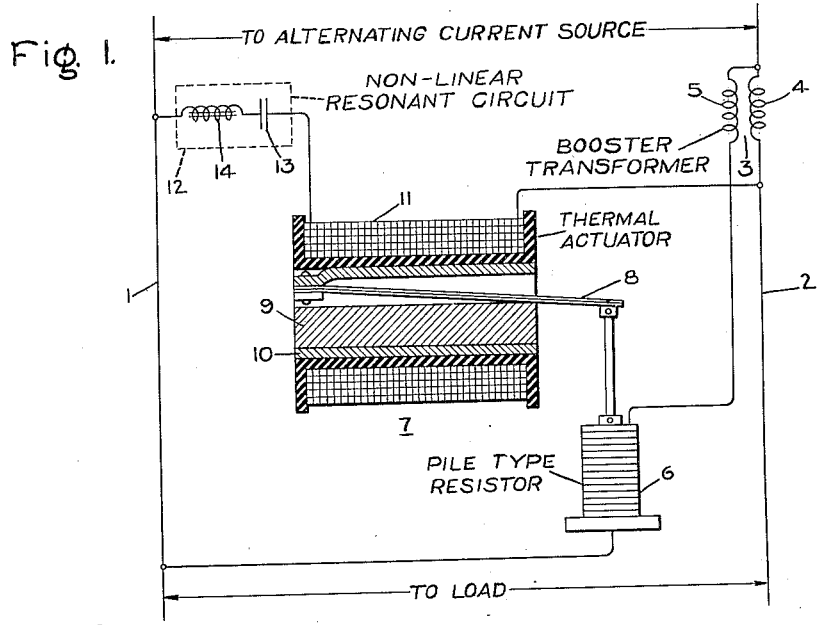
Figure 2:
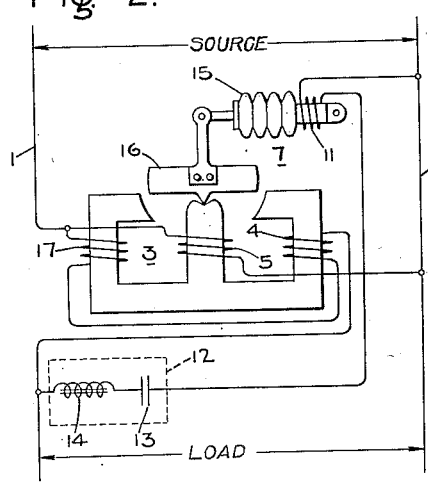
Figure 3:
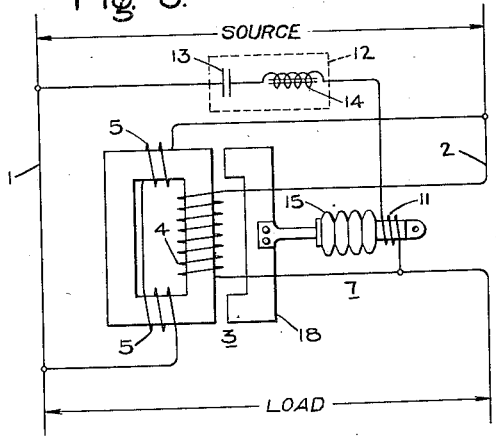
Figure 4:
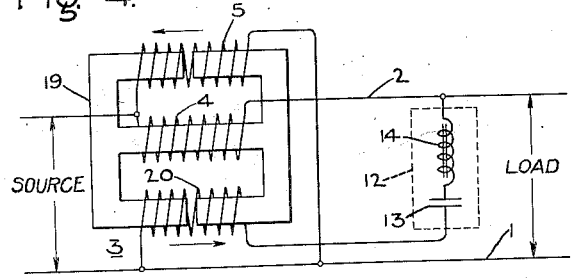

In the drawing, Fig. 1 is a diagrammatic showing of an embodiment of my invention wherein a carbon pile resistor is actuated by the thermal actuator for controlling the booster transformer; Fig. 2 is a modification in which the thermal actuator employs a gas-filled bellows instead of a bimetallic strip as in Fig. 1, and in which the booster transformer is provided with a bucking winding; Fig. 3 is a diagrammatic illustration of another embodiment of my invention utilizing a different form of booster transformer, and Fig. 4 is another modification in which the thermal actuator is omitted and a still different form of booster transformer is used.

Referring now to Fig. 1 of the accompanying drawing, 1 and 2 are the conductors of a single phase alternating current circuit, the upper end of which (as viewed in the drawing), may be considered as being connected to a suitable source of alternating current supply and the opposite end of which may be considered as leading to a suitable load or loads. Connected in the circuit is a suitable variable voltage transformer 3 for regulating the voltage of the circuit. This transformer may be of any suitable type and is shown as a simple booster auto-transformer having a series winding 4 and a shunt or primary winding 5. The winding 5 is connected across the circuit and has in series therewith a variable current limiting device 6 which may be of any suitable type and which is shown as a compressible pile type resistor. This resistor may either be an ordinary carbon pile or it may be a special pile resistor of the type disclosed and claimed in an application of Louis W. Thompson, Serial No. 743,849, filed September 13, 1934, and assigned to the assignee of the present application. In the Thompson application carbon or graphite plates are interleaved with metal spacers and when pressure is applied to the pile there is a rocking action and successive sections of the resistance path are short-circuited.

For controlling the resistance value of the resistor 6 there is provided a thermal actuator 7 which may be of any suitable type. The details of the illustrated form of actuator are shown and claimed in my application, Serial No. 759,719, filed December 29, 1934, and assigned to the assignee of the present application. In that application the actuator is shown for controlling the contacts of a thermal relay. As employed in Fig. 1, this actuator consists essentially of a bimetallic strip 8 mounted in a slot in an iron core 9 which is surrounded by a copper sleeve or jacket 10 around which is wound a coil 11. An alternating current is passed through the coil 11, eddy currents are induced in the copper sleeve 10 which result in heating and this heat is communicated to the strip 8 which is so constructed that it moves upward and relieves the pressure on the pile 6 as the temperature rises.

The coil 11 is connected to be responsive to the voltage of the circuit 1—2 and in order to make the energization of the coil 11 very sensitive to changes in voltage I provide a non-linear circuit or circuit element 12 for causing changes in the current in the coil 11 to vary more widely than mere proportional changes to changes in the voltage of the circuit. This non-linear means may be any suitable type such as a high temperature coefficient resistor, or an instantaneously acting resistance material such as is described and claimed in McEachron Patent No. 1,822,742 granted September 8, 1921 and assigned to the assignee of the present application. However, I prefer to employ a non-linear resonant circuit comprising a series connected capacitor 13 and iron core reactor 14. Such a circuit is termed non-linear because one of its elements, namely the reactor, has a non-linear volt-ampere characteristic due to the magnetization or saturation characteristic of the iron core. An ordinary series resonant circuit comprising a simple air core reactor and capacitor is responsive only to changes in frequency, but by using a non-linear element, such as a reactor with a saturable core, the actual inductance of the reactor changes with changes in current through it so that at a particular value of inductance the circuit may be made to become resonant and consequently the resonance is responsive to voltage or current.

The operation of Fig. 1 is as follows: When the alternating current circuit 1—2 is energized the voltage across the primary winding 5 of the transformer 3 is equal to the circuit voltage minus the voltage drop across the resistor 6. If the circuit voltage is substantially normal the current through the heating winding 11, the capacitor 13 and the reactor 14 is such as to produce a flux in the core of the reactor 14 which is of sufficient value to work the core at that portion of the saturation curve thereof which will cause the inductance of the reactor to correspond to the capacitance of the capacitor and thus produce resonance. Consequently, at normal voltage there will be a relatively high current flow through the heating coil 11 which induces relatively heavy eddy currents in the sleeve 10 thereby heating the strip 8 and causing it to move upwardly to its uppermost position thereby relieving the pressure on the pile 6. Consequently the resistance of the pile 6 will be a maximum which means that the division of voltage between the resistor 6 and the primary winding 5 will be such that most of the voltage will be across the resistor and minimum voltage will be across the primary winding 5. Consequently a minimum voltage boost will be induced in the circuit by the booster transformer. If now the voltage of the circuit 1—2 tends to fall for any reason at all, such as an increase in the load current therethrough, less voltage will be applied to the series resonant circuit, and also to the coil 11, so that less flux will flow through the coil 14 of the reactor thereby changing the inductance of the reactor with the result that but a very slight change in circuit voltage will cause the non-linear circuit to go out of resonance thereby sharply reducing the current in the heating coil 11. This, of course, will reduce the heating effect whereby the bimetalic member 11 will move downward and progressively increase the pressure on the pile 6 thereby decreasing its resistance. This decrease in resistance will decrease the voltage across the resistor 6 which means that a corresponding increased voltage will be applied to the primary winding of the transformer 5 and consequently an increase in voltage boost will be induced in the circuit 1—2 by the booster transformer. By properly correlating its various parts the system can be made very sensitive to changes in circuit voltage and can be made to hold very nearly constant load voltage over a wide range of load current. At the same time the thermal actuator has a certain amount of time lag due to the heat stored therein. This prevents unnecessary operation of the bimetallic strip 8 and the interconnecting linkage between this strip and the compressible pile. Consequently momentary slight changes in voltage will not cause unnecesary operation of the regulating means.

It will of course be obvious to those skilled in the art that any one or even two of the four main elements shown in Fig. 1 may be omitted and the resulting combination will still be capable of general application. For example, the combination of a non-linear circuit and a thermal actuator may be used generally in control circuits and is not limited to use in the particular voltage control circuit shown in combination with a pile type resistor and a booster transformer. Likewise the control of a booster transformer by means of a compressible pile resistor or by means of a thermal actuator or by means of a non-linear resonant circuit or by any two of these means are all embraced within my invention.

In Fig. 2 the resistor 6 has been omitted and the thermal actuator 7 controls directly the regulating action of the transformer 3. Furthermore the thermal actuator 7 has the bimetallic strip 8 of Fig. 1 replaced by a gas filled bellows 15. In addition, the booster transformer 3 is constructed in a special manner and is provided with an E-shaped core having a movable bridging member 16 which is adapted to be rocked about a suitable pivot point in accordance with the expansion and contraction of the bellows 15. The primary winding 5 of transformer 3 is mounted on the center leg of the core and the secondary or boosting winding 4 is mounted on one of the outer legs. In addition there is provided a bucking winding 17 on the other outer leg of the core and the windings 4 and 17 are connected in series.

In the operation of Fig. 2 when the voltage of the circuit 1—2 tends to become too high the winding 11 of the thermal actuator causes increased heating which causes the bellows 15 to expand whereby the magnetic bridging member 16 is rocked in a counter-clockwise direction. This causes most of the flux produced by the primary winding 5 to pass through the bucking winding 17 since the reluctance of the path on which the winding 17 is wound will be less than the path on which the winding 4 is wound because of the change in air gaps due to this counter-clockwise motion of the bridge member 16. Consequently, the bucking voltage of winding 17 will be greater than the boosting voltage of winding 4 so that the net effect will be to lower the voltage of the circuit. Similarly, if the voltage of the circuit becomes too low the thermal actuator cools allowing the bellows 15 to contract whereby the bridge member is moved in a clockwise direction thereby reducing the air gap in the magnetic circuit including the primary winding 5 and the boosting winding 4 and increasing the air gap in the magnetic circuit including the primary winding 5 and the bucking winding 17. Consequently, a net voltage boost is produced in circuit 1—2 by the transformer 3, which tends to correct the low voltage condition. During intermediate conditions bridging member 16 will assume intermediate positions whereby the relative values of the voltage buck and boost produced by the windings 17 and 4 will produce net effects which are such as substantially to maintain the voltage of circuit 1—2 constant.

In Fig. 3 the transformer 3 has an ordinary core and the thermal actuator 7 is arranged to operate a magnetic shunting member 18.

The operation of Fig. 3 is such that as the thermal actuator 7 cools due to low voltage conditions on the circuit 1—2 the bellows 15 in contracting will move the magnetic shunting member 18 away from the core of the transformer thereby shunting less and less of the flux so that more and more of the flux passes through the secondary winding 4 thereby increasing the voltage boost of the transformer. Similarly, when the voltage is too high, the increased heating of the thermal actuator will cause the shunting member 18 to be moved toward the core of the transformer thereby shunting more and more of the flux away from the secondary winding 4 and causing less and less voltage boost.

In Fig. 4 the booster transformer has a three-legged core 19 on one leg of which is wound the secondary winding 4 and on another leg of which is wound the primary winding 5. The remaining leg carries a second primary winding 20 which is connected across circuit 1—2 in series with the non-linear resonant circuit 12. The primary windings 5 and 20 are wound so as to produce opposite effects on the secondary winding 4 and preferably the legs on which the primary windings are wound are provided with air gaps as shown.

In operation, the circuit of Fig. 4 may be so arranged that for normal voltage the primary windings 5 and 20 neutralize each other with respect to the secondary winding 4 so that no voltage buck or boost is produced in the circuit. If the voltage increases, the resonant circuit 12 will go further into resonance thereby causing the winding 20 to predominate over the winding 5 and cause a voltage buck to be produced in the circuit. If the voltage falls below the normal value the resonant circuit 12 will go further out of resonance thereby decreasing the current in the winding 20 so that the winding 5 predominates over the winding 20 thereby reversing the voltage in the secondary winding 4 whereby a voltage boost is produced. For example, if the voltage of the source is 110 volts and the booster transformer can add 10 volts, which will make 120 volts on the load, the boosting energy will be supplied by the primary winding 5. If the resonant circuit 12 begins to go into resonance at 110 volts on the load side of the circuit and is in full resonance at 120 volts, winding 20 is so arranged that at half resonance the windings 5 and 20 neutralize each other. At full resonance the winding 20 will cause a bucking effect which will be substantially equal to the boosting effect produced by the primary winding 5 when the resonant circuit is completely out of resonance.

The above regulating circuits may be applied near the watt-hour meters where the alternating current supply enters a house or they can be inserted in a transformer casing, such as in a pole type transformer outside the house, and if desired they can be entirely immersed in oil in the transformer tank.

While I have shown and described particular embodiments of my invention it will be obvious to those skilled in the art that changes and modifications may be made therein and consequently I aim in the appended claims to cover all such changes and modifications as fall within the true spirit and scope of my invention.

What I claim as new and desire to secure by Letters Patent of the United States, is:

1. In combination, a variable voltage transformer, means including an electrically heatable thermal actuator for controlling the voltage of said transformer, and non-linear volt-ampere characteristic means for modifying the action of said actuator.

2. In combination, a booster transformer, means including a bimetallic strip for controlling the voltage applied to the primary winding of said transformer, an electric heater for applying heat to said strip, and a non-linear resonant circuit connected in series with said heater.

3. In combination, an alternating current circuit, apparatus for controlling an electrical characteristic of said circuit, means including a non-linear resonant circuit connected to be responsive to the value of said characteristic for controlling said first mentioned means, and means for introducing a time delay between the controlling effect of said non-linear resonant circuit and the operation of said means for controlling a characteristic of said alternating current circuit.

4. In combination, an alternating current circuit, a booster transformer connected therein, means including a series type ferro-resonant non-linear circuit connected to be responsive to the voltage of said alternating current circuit for varying the voltage of said transformer, and means for interposing a time delay between the response of said non-linear circuit and the corresponding variation in voltage of said transformer.

5. In combination, an alternating current circuit, a booster transformer connected therein, a pile type variable resistor for controlling the voltage of said transformer, thermally responsive means for actuating said carbon pile, electrical means responsive to the voltage of said circuit for heating said thermally responsive means, and a voltage responsive non-linear resonant circuit for increasing the sensitivity of said heating means to the voltage of said circuit.

6. In combination, an alternating current circuit, a booster transformer connected therein, a pile type resistor connected in series with the shunt winding of said transformer, a bimetallic strip for actuating said resistor, means for heating the said strip including a winding connected across said circuit, a capacitor and an iron core reactor connected in series with said winding, said reactor and capacitor being constructed and proportioned so as to produce series resonance when the voltage of said circuit attains a predetermined value.

7. In combination, a booster transformer, a movable magnetic member for varying the voltage boost of said transformer, and a thermal actuator having a thermally movable element which is mechanically connected to move said member.

8. In combination, a booster transformer, a movable magnetic member for varying the ratio of flux through the windings of said transformer, a thermal actuator for moving said member, and a non-linear volt-ampere characteristic element for modifying the operation of said actuator.

9. In combination, a transformer having an E-shaped core, a primary winding on the center leg of said core, bucking and boosting secondary windings on the outer legs respectively connected in series with each other, a pivotally mounted movable magnetic bridging member for varying the air gaps between the legs of said core, and means for moving said member.

10. In combination, a regulator for an electric circuit, and means for controlling said regulator comprising a pair of electroresponsive devices one of which is relatively slow acting and relatively insensitive with respect to the other, said relatively sensitive quick acting device being connected to be responsive to an electrical condition of said circuit, said relatively insensitive slow acting device being connected to be controlled by said relatively sensitive quick acting device so as to produce a relatively sensitive but relatively slow acting control of said regulator.

11. In combination, a regulator for an electric circuit, and means for automatically controlling said regulator comprising an electroresponsive thermal actuator and a negative impedance-current characteristic electroresponsive means, said thermal actuator being relatively insensitive and relatively slow acting with respect to the sensitivity and speed of action of said negative impedance-current characteristic means, said thermal actuator and said negative impedance characteristic means being connected in series circuit relation to be responsive to an electrical condition of said circuit whereby relatively sensitive effectively time delayed regulation of said electrical condition is obtained.

12. In combination, a voltage regulator for an electric circuit, and means for controlling said regulator comprising a pair of electroresponsive devices one of which is relatively slow acting and relatively insensitive with respect to the other, said relatively sensitive quick acting device being connected to be responsive to the voltage of said circuit, said relatively insensitive slow acting device being connected to be controlled by said relatively sensitive quick acting device so as to produce a relatively sensitive but relatively slow acting control of said regulator.

13. In combination, a regulator for an electric circuit, said regulator having a variable resistance, and means for controlling said resistance comprising a pair of electroresponsive devices one of which is relatively slow acting and relatively insensitive with respect to the other, said relatively quick acting device being connected to be responsive to an electrical condition of said circuit, said relatively insensitive slow acting device being connected to be controlled by said relatively sensitive quick acting device so as to produce a relatively sensitive but relatively slow acting control of said resistance.

BENJAMIN W. JONES.